July 9, 1929.    S. M. HALSTEAD ET AL    1,720,326
IMPREGNATING RUNNING WATER WITH DETERGENTS
Filed Nov. 26, 1926

INVENTORS
Stanley M. Halstead
Anton J. Wickland

John A. Raismith
ATTORNEY

Patented July 9, 1929.

1,720,326

UNITED STATES PATENT OFFICE.

STANLEY M. HALSTEAD AND ANTON I. WICKLAND, OF SAN JOSE, CALIFORNIA.

IMPREGNATING RUNNING WATER WITH DETERGENTS.

Application filed November 26, 1926. Serial No. 151,000.

The present invention relates particularly to the method and mechanism for supplying desired quantities of soap solution or any other desired substance or combination of substances to the water being used for cleaning.

It is one object of the present invention to provide a means for introducing the desired quantity of any suitable cleaning solution into the pipe line of the water being used, and in any desired ratio to the water used.

It is another object of the invention to provide a means of the character indicated that will be automatic in operation, simple in construction, economical to manufacture, and highly efficient in its practical application.

In the drawing:—

Figure 1:
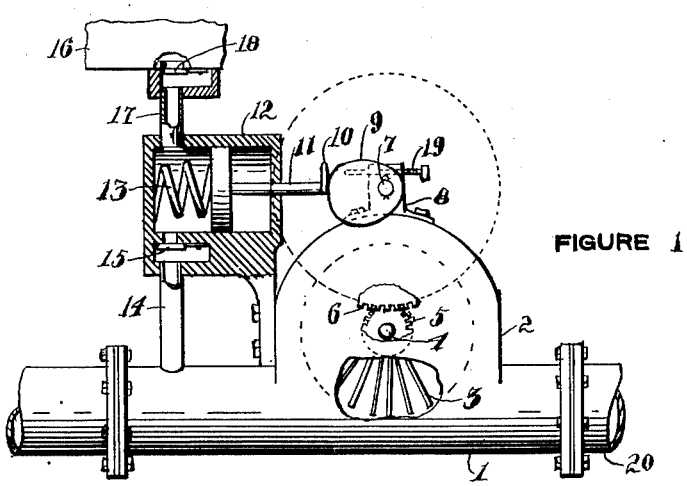
Figure 1 is a side elevation of a device embodying one form of our invention, partly in section and part broken away.
Figure 2:
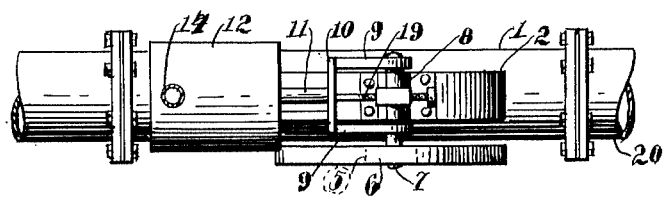
Figure 2 is a plan view of the same.

Referring more particularly to the drawing, we show at 1 a pipe section provided with an upstanding chamber 2 in which is mounted a water wheel 3. On the shaft 4 of the wheel is mounted a pinion 5 meshing with a gear 6 mounted on shaft 7 which is in turn mounted in bearing 8 on the chamber 2.

On the shaft 7 are mounted a pair of similar cams 9, these cams engaging a bar 10 mounted on the outer end of a piston 11 which is operatively mounted to reciprocate in a cylinder 12 mounted on the pipe section 1. The cylinder 12 has a spring 13 inserted therein to operate against the piston head whereby to move it in the direction opposite to that imparted by the cams 9.

Cylinder 12 is connected to the pipe section 1 by a conduit 14 fitted with a check valve 15 adapted to permit liquid to be discharged from the cylinder to the pipe section 1. At 16 is shown a reservoir communicating with the cylinder 12 by means of a conduit 17 fitted with a check valve 18 adapted to permit liquid to flow into the said cylinder. A rod 19 is threaded into the bearing member 8 in such a manner as to form a stop for the piston 11 and limit its range of movement.

Assuming the device to have been assembled as described with the tank 16 supplied with a solution to be introduced into the pipe line 20 in which the structure is inserted. When the water is flowing through the line and the wheel 3 is operated thereby the parts 4, 5, 6 and 7 are rotated and the cams 9 caused to operate the piston 11 in one direction while the spring 13 operates it in the opposite direction. The distance travelled by the piston may be regulated by the rod 19.

The backward movement of the piston causes liquid to flow from tank 16 into the cylinder 12, and the forward movement of the piston forces the liquid out of the cylinder into the pipe line as desired.

It is obvious from the foregoing description that the amount of liquid introduced at each stroke of the piston is readily gauged by the rod 19, and the speed of the piston is gauged by the flow of water through the pipe line 20. Consequently, when the stop 19 is once set the water in line 20 will be impregnated with the desired proportion of liquid from tank 16 regardless of the rate of its flow through the pipe 20.

Figure 3:
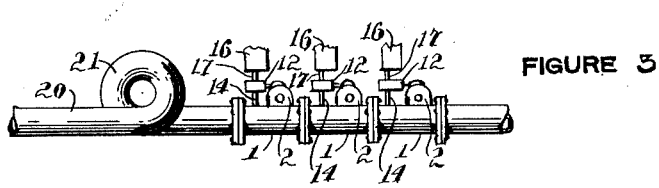
Figure 3 is an illustration showing the application of the invention to a pipe line fitted with a pump for increasing the water pressure.

In Figure 3 is shown the pipe line 20 fitted with a booster pump 21 and three of the devices described, the pump being inserted between the several devices and its discharge end. By this arrangement three different substances may be introduced into the water stream as desired, and the material introduced is thoroughly mixed with the water by the pump 21.

It is to be understood, of course, that while we have herein shown and described but one specific embodiment of the invention, changes in form, construction and method of application and operation may be made within the scope of the appended claims.

We claim:

The combination with a pipe line of a chamber formed thereon and a water-wheel mounted in the chamber and extending into the pipe line, a cylinder mounted on the pipe line and communicating therewith, a supply reservoir communicating with the cylinder, check valves operatively mounted to control the flow of liquid to and from said cylinder, a piston mounted in the cylinder, a spring inserted between the piston and cylinder whereby to actuate the piston in one direction, and means for actuating the piston in the opposite direction, said means comprising a shaft on said water-wheel, a second shaft mounted adjacent thereto, driving connections between said shafts, and a cam on the second mentioned shaft adapted to engage the said piston and move the same against the spring.

STANLEY M. HALSTEAD.
ANTON I. WICKLAND.